Aug. 5, 1969　　　R. J. WEIR ET AL　　　3,460,033
APPARATUS FOR MEASURING SHAFT ROTATION
Filed May 4, 1966

Inventors
ROBERT JAMES WEIR
ANTHONY DAVID HEWITT
By
Cushman, Darby & Cushman
Attorneys

United States Patent Office 3,460,033
Patented Aug. 5, 1969

3,460,033
APPARATUS FOR MEASURING SHAFT ROTATION
Robert James Weir and Anthony David Hewitt, Norton-on-Tees, England, assignors to Imperial Chemical Industries Limited, London, England, a corporation of Great Britain
Filed May 4, 1966, Ser. No. 547,539
Claims priority, application Great Britain, July 26, 1965, 31,782/65
Int. Cl. G01r 11/02
U.S. Cl. 324—70          5 Claims

ABSTRACT OF THE DISCLOSURE

A device for detecting rotational motion of a shaft comprising a magnet, and a "hall-type" semi-conductor transducer situated within the magnetic field of the magnet and stationary relative to the magnet. The shaft has a magnetically detectable portion movable relative to the magnetic field along a path which is at least in part within the field. Rotation of the shaft thereby varies the magnetic field through the transducer to produce a series of pulses which enable the speed of the shaft to be measured.

Disclosure

Figure 1:
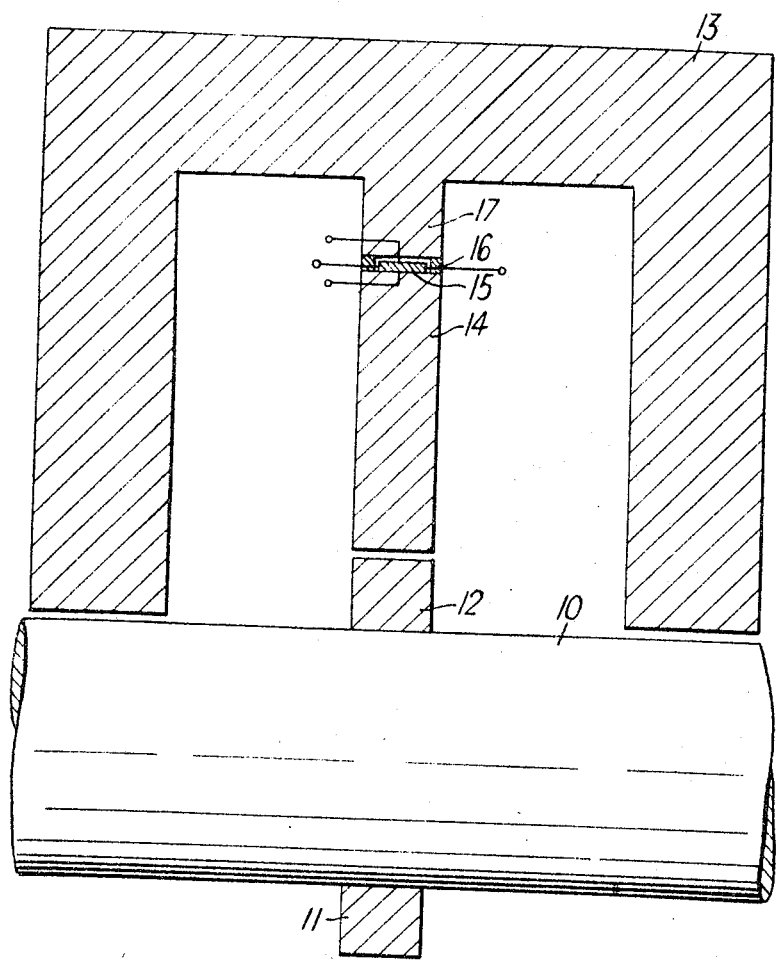

This invention is concerned with proximity detectors.

Conventional proximity detectors make use of a change in intensity of a magnetic or electric field or electromagnetic radiation. Those depending upon electromagnetic radiation are particularly susceptible to fouling, which tends to reduce the intensity of incoming pulses of radiation so that they may not be distinguishable from spurious pulses. Detectors which make use of changes in magnetic or electric fields are much less susceptible to fouling unless the fouling material has a high permeability or dielectric constant.

The most commonly employed detector comprises a magnet and a coil in which a current is developed in response to a change in the magnetic field in the coil. These detectors are used, in particular, for measuring the speed of rotating shafts by producing a pulse each time a portion of magnetically different material, e.g. a stud projecting from the shaft, moves past the detector. The pulses produced is, however, dependent upon the rate of change of the magnetic field, and is therefore somewhat diffused. This imposes a speed limit for this type of detector in that the time interval between successive pulses must be sufficiently great to enable the pulses to be distinguished from spurious background signals. In addition, the inability of most practical detectors to provide sharp pulses tends to reduce the accuracy of the speed measurement at the higher speeds. Furthermore, the detector has a lower speed limit by virtue of the fact that the rate of flux change must be sufficient to produce a detectable pulse.

The use of inductive loads in potentially explosive atmospheres, such as may be found in chemical plants and refineries is unsatisfactory from a safety point of view. A detector employing a coil wound on a magnet could be polarised and even if only a small current energises the coil there is a danger that when the circuit is broken a spark may be produced which will ignite the surrounding atmosphere.

According to the present invention a proximity detector comprises a "Hall-type" semi-conductor transducer, magnet means for applying a magnetic field to the transducer, first electrical connecting means for supplying an electric current to the transducer, second electrical connecting means for an electric current produced by a potential difference in the transducer and means for providing at least a part of a magnetic circuit which circuit includes a proximity detecting zone.

Conveniently the magnet means comprises a permanent magnet preferably of a high flux type. The means for providing the magnetic circuit may comprise a suitably shaped yoke of magnetic material.

The Hall-type semi-conductor transducer may comprise any one of the materials which exhibit the Hall effect. When an electric current is applied across such a transducer in a direction perpendicular to an applied magnetic field a voltage is developed across a transducer in a direction mutually perpendicular to the directions of the applied field and current, the potential difference developed being dependent upon the strength of both the field and the current. This is known as the Hall effect. In the present application of these transducers the applied current is maintained at a constant value or is varied in a predetermined manner so that changes in magnetic field can be detected by means of the potential difference developed in the transducer.

When it is desired to measure the speed of a rotating shaft using the proximity detector of this invention it is necessary to provide a magnetically detectable portion on the shaft. This may be of any conventional type, such as a plug of a different metal inserted in the body of the shaft or, alternatively, a stud which projects from the surface of the shaft. The stud may be of a different metal to that of the shaft although it is convenient to use the same metal.

Figure 2:
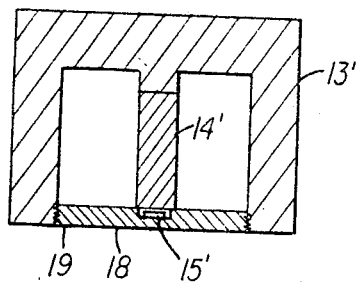

A preferred embodiment of the invention is described hereinafter by way of example only, with reference to the accompanying drawing wherein FIGURE 1 is a schematic vertical sectional view of one form of detector and FIGURE 2 is a similar view of a modified form of detector on a reduced scale.

The detector, shown in cross-section in the drawing is designed specifically for measuring the speed of a shaft. The shaft 10, which may for example, be a steam-turbine shaft, is provided with two cylindrical studs 11 and 12 diametrically opposed to one another. It would be possible to use one stud only but this would tend to unbalance the shaft. The number of studs may, of course, be increased provided that they art distributed evenly around the shaft but this number is limited by virtue of the fact that at higher stud densities successive studs tend to interfere with one another. For high speed applications, therefore, it is preferred to use two diametrically opposed studs as shown. If desired, studs of rectangular section may be used to provide a pulse with a linear leading edge.

The detector comprises a closed cylindrical soft iron yoke 13 having an integral cylindrical projection 17. A cylindrical magnet 14 having a diameter substantially equal to that of the projection 17 is disposed axially of the yoke 13, a spacer 16 being provided between the projection and the magnet to provide a compartment for a Hall-type transducer 15. The compartment is made larger than the transducer in order to prevent the transducer being mechanically damaged. The whole assembly is preferably potted with an epoxy resin which provides a robust single unit.

Alternatively, as shown in FIGURE 2, the transducer 15' may be housed in a similar compartment at the other end of the magnet 14'. In order to protect the transducer the compartment may be provided in one face of a solid cylinder 18 of non-magnetic material (e.g. brass), the cylinder 18 having an external thread 19 which can co-operate with a thread provided internally of yoke 13'. The cylinder can then be screwed in until its face abuts the end of the magnet 14.

In operation, the transducer is energised with an intrinsically safe supply of direct current at about 100 milliamps. The potential difference developed at this current for a change is magnetic flux of 1 kilogauss is typically about 17 millivolts which may be sufficient to be utilised without any voltage amplification as the source impedance is very low, being typically about 12 ohms. The impedance of the transducer is mainly resistive so that the dangers of employing inductive loads are avoided.

This type of detector provides a comparatively sharp and reproducible pulse so that speeds can be measured more accurately than with the induced current type of detector. Despite the improved shape of the pulse, however, a pulse shaping circuit may be employed between the detector and the pulse receiving circuit.

One particular application of this type of detector is as an overspeed detector for rotating shafts. The pulses produced may be compared with a standard pulse frequency from a crystal clock, a frequency of a megacycle per second being very suitable for this purpose.

We claim:
1. A device for detecting rotational motion of a shaft comprising: a hollow cylindrical soft iron yoke closed at one end with magnetic material and disposed with its longitudinal axis normal to the axis of the shaft with said one end furthest from the shaft; a magnet disposed with its ends lying in a plane normal to the axis of the shaft, said magnet being disposed within said yoke and magnetically connected to said one end of said yoke; a Hall-type semiconductor transducer disposed within the magnetic field of said magnet and supported by said yoke so as to be stationary relative to said magnet; first and second electrical connecting means for, respectively, supplying an electrical current to said transducer and conducting electrical current produced by a potential difference in the transducer; two and only two, magnetically detectable portions carried by the shaft in diametrically opposite positions and movable, upon rotation of the shaft, relative to the magnetic field along a path disposed at least in part within that field whereby the magnetic field through said transducer varies with the speed of shaft rotation.

2. A device according to claim 1 wherein the end of said cylindrical yoke nearest the shaft is open and wherein said transducer is disposed between said magnet and said one end of said yoke.

3. A device according to claim 1 wherein said transducer is disposed between said magnet and the shaft.

4. A device according to claim 3 including a plate of non-magnetic material closing the end of said yoke nearest the shaft, said transducer being disposed in a compartment provided in the fact of said plate.

5. A device according to claim 4 wherein said plate is cylindrical and is fitted into the bore of said yoke.

References Cited

UNITED STATES PATENTS

| | | | |
|---|---|---|---|
| 3,060,370 | 10/1962 | Varterasian | 324—45 |
| 3,243,692 | 3/1966 | Heissmeier | 324—45 |
| 3,366,909 | 1/1968 | Hini | 324—45 |

FOREIGN PATENTS

| | | |
|---|---|---|
| 926,885 | 4/1955 | Germany. |
| 835,020 | 5/1960 | Great Britain. |

RUDOLPH V. ROLINEC, Primary Examiner

MICHAEL J. LYNCH, Assistant Examiner

U.S. Cl. X.R.

324—45